US012567915B2

(12) United States Patent
Maestle et al.

(10) Patent No.: US 12,567,915 B2
(45) Date of Patent: Mar. 3, 2026

(54) METHOD AND DEVICE FOR PROCESSING DATA ASSOCIATED WITH A MODEL CHARACTERIZING A PROPAGATION OF TERAHERTZ RADIATION

(71) Applicant: Helmut Fischer GmbH Institut fuer Elektronik und Messtechnik, Sindelfingen (DE)

(72) Inventors: Ruediger Maestle, Boeblingen (DE); Lars-Christian Anklamm, Berlin (DE)

(73) Assignee: HELMUT FISCHER GMBH INSTITUT FUER ELEKTRONIK UND MESSTECHNIK, Sindelfingen (DE)

( * ) Notice: Subject to any disclaimer, the term of this patent is extended or adjusted under 35 U.S.C. 154(b) by 279 days.

(21) Appl. No.: 18/032,005

(22) PCT Filed: Jul. 20, 2021

(86) PCT No.: PCT/EP2021/070228
§ 371 (c)(1),
(2) Date: Apr. 14, 2023

(87) PCT Pub. No.: WO2022/078644
PCT Pub. Date: Apr. 21, 2022

(65) Prior Publication Data
US 2023/0388033 A1       Nov. 30, 2023

(30) Foreign Application Priority Data
Oct. 16, 2020     (DE) .......................... 102020127387.8

(51) Int. Cl.
*H04B 17/391*          (2015.01)
*H04B 17/373*          (2015.01)

(52) U.S. Cl.
CPC ......... *H04B 17/391* (2015.01); *H04B 17/373* (2015.01)

(58) Field of Classification Search
CPC .. H04B 17/391; H04B 17/373; H04B 7/0626; H04B 7/0632; H04B 7/0857;
(Continued)

(56) References Cited

U.S. PATENT DOCUMENTS

| | | | |
|---|---|---|---|
| 7,145,148 B2 * | 12/2006 | Alfano ................... | G01N 21/35 |
| 2010/0171651 A1 * | 7/2010 | Scheiber ............... | H04B 17/39 342/179 |

(Continued)

FOREIGN PATENT DOCUMENTS

| | | |
|---|---|---|
| CA | 3062502 A1 | 11/2018 |
| CA | 3097229 A1 | 10/2019 |

(Continued)

OTHER PUBLICATIONS

Feige et al., "Beruehrungslose Mehrlagen-Schichtdickenmessung industrieller Beschichtungen mittels THz-Messtechnik" TM-Technisches Messen/Plattform Fuer Methoden, Systeme Und Anwendungen Der Messtechnik, DE, vol. 79, No. 2, pp. 87-94 (2012), cited in International Search Report for corresponding PCT Appln. No. PCT/EP2021/070228.

*Primary Examiner* — Lana N Le
(74) *Attorney, Agent, or Firm* — KRIEGSMAN & KRIEGSMAN

(57) ABSTRACT

The invention relates to a method for processing data associated with a model characterizing a propagation of terahertz (THz) radiation in a spatial region, the spatial region comprising at least one terahertz device for emitting and/or receiving terahertz radiation and/or at least one object which can be subjected to terahertz radiation, said method comprising: providing the model; characterizing, by means of the model, a propagation of the terahertz radiation in the (Continued)

Figure 1:
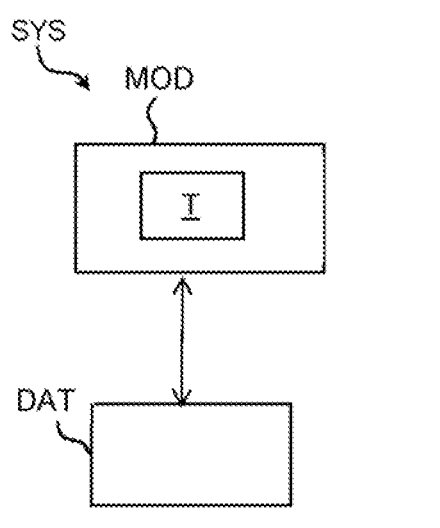
Figure 1:
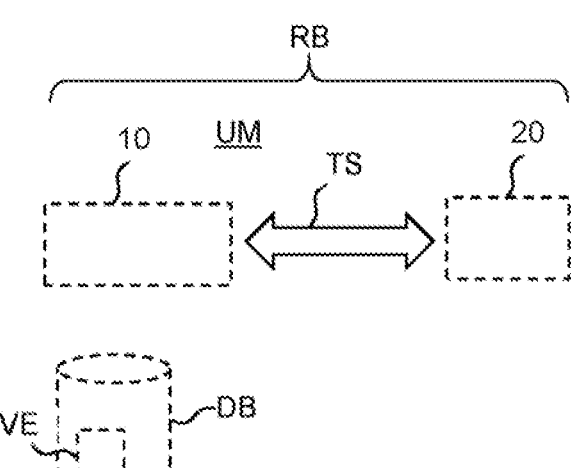

area of at least one boundary surface between two media that adjoin in the spatial region, wherein the model has a term that depends of at least one of the following elements: a) frequency of the terahertz radiation, b) spatial expansion of at least one of the two adjoining media, for example along a first spatial direction.

23 Claims, 6 Drawing Sheets

(58) Field of Classification Search
CPC ...... H04B 17/27; H04B 17/24; H04B 10/503; H04B 10/61; H04B 1/10; H04B 1/1027; H04B 7/086; H04B 7/18589; H04B 17/102; H04B 7/024; G01N 21/35; G01N 21/3581; G01N 21/3586; G01N 21/59; G01N 2291/044; G01N 21/25; G01N 21/359; G01N 21/3563; H04W 40/20; H04W 4/00; H04W 52/42; H01Q 19/132; H01Q 1/06; G01B 11/0625; G01J 3/108; G01J 5/0014; G01J 5/0896
See application file for complete search history.

(56) References Cited

U.S. PATENT DOCUMENTS

| | | | | |
|---|---|---|---|---|
| 2011/0096680 | A1* | 4/2011 | Lindoff ................ | H04B 17/373 |
| 2015/0212060 | A1 | 7/2015 | Van Mechelen et al. | |
| 2017/0336261 | A1* | 11/2017 | Fujihara ............ | G01N 21/3563 |
| 2019/0383599 | A1 | 12/2019 | Gregory et al. | |
| 2020/0173766 | A1 | 6/2020 | Thiel | |
| 2020/0306780 | A1 | 10/2020 | Maas et al. | |
| 2021/0381828 | A1* | 12/2021 | Klose ..................... | G01N 21/35 |
| 2023/0006746 | A1* | 1/2023 | Sjödin ................. | H04B 17/391 |
| 2024/0429998 | A1* | 12/2024 | Buer ................... | H04B 7/1858 |

FOREIGN PATENT DOCUMENTS

| | | | | | |
|---|---|---|---|---|---|
| EP | | 2899499 | A1 | 7/2015 | |
| FR | | 3150097 | A1 * | 12/2024 | .......... G01N 29/069 |
| WO | 2015073807 | A1 | | 5/2015 | |

* cited by examiner

110 — [ ]  ← MOD-OPT

↓ T, T-1, T-2, T-3, ..

112 — [ ]

120

120a — [ ]

↓

120b — [ ]

↓

120c — [ ]

↓

122 — [ ]

↓

METHOD AND DEVICE FOR PROCESSING DATA ASSOCIATED WITH A MODEL CHARACTERIZING A PROPAGATION OF TERAHERTZ RADIATION

This disclosure relates to a method of processing data that is associated with a model that characterises a propagation of terahertz (THz) radiation within a space region.

The disclosure further relates to a device for processing data that is associated with a model characterising a propagation of terahertz (THz) radiation within a space region.

Exemplary embodiments relate to a method of processing data that is associated with a model characterising a propagation of terahertz (THz) radiation within a space region, wherein the space region includes at least one terahertz device for emitting and/or receiving the terahertz radiation and/or at least one object that may be exposed to the terahertz radiation, wherein the method includes: Providing the model, Characterising, by means of said model, a propagation of the terahertz radiation in the region of at least one boundary surface between two adjacent media in the space region, wherein the model includes a term characterising the THz radiation and depending on at least one of the following elements: a) the frequency of the terahertz radiation, b) the spatial extension and/or position of at least one of the two adjacent media, for example along a first spatial direction.

In further exemplary embodiments, provision is made for the model to characterise at least one reflection and/or transmission of the terahertz radiation at the at least one boundary surface between the at least two media, wherein, for example, the model characterises several reflections and/or transmissions of the terahertz radiation on at least two boundary surfaces between different media, wherein, for example, the term characterising the terahertz radiation has a different value for each of the at least two boundary surfaces.

In further exemplary embodiments, provision is made for the model to characterise one, or the plurality of, reflection(s) and/or transmission(s) of the terahertz radiation on a plurality of boundary surfaces between every two adjacent media in the space region by means of a coherent superposition function, wherein the term is provided as a weighting factor, for example a weighting factor other than one, for at least some components of said coherent superposition function.

In further exemplary embodiments, provision is made for the model to have a first component which characterises a sample measurement on the object in a reflection arrangement or a transmission arrangement by means of the terahertz radiation, wherein, for example, the first component may be characterised, in a frequency domain for, for example, the reflection arrangement, on the basis of the following equation:

$$F_S(\omega, x, y, z) =$$

$$I_0(\omega, x, y, z)\exp\left[-i\frac{\omega}{c_0}[2(L + \Lambda D)(n_A - i \in_A)] + i\Phi_0(\omega, x, y, z)\right] \cdot$$

$$\left(t_{A1}t_{1A}\sum_{R=0}^{\infty}r_{1S}^{R+1}r_{1A}^{R}G(D, R, \omega, x, y, z, \alpha, \beta, \Omega)\right.$$

$$\left.\exp\left[-i\frac{\omega}{c_0}(2R+2)D(n - i \in)\right] + r_{A1}\right),$$

wherein $F_S(\omega, x, y, z)$ characterises a field strength of a sample signal which may, for example, be frequency-dependent, wherein w characterises angular frequency associated with a frequency of the terahertz radiation, wherein x characterises a first space coordinate, wherein y characterises a second space coordinate, wherein z characterises a third space coordinate, wherein $I_0(\omega, x, y, z)$ characterises a field strength of the terahertz radiation at an emitter generating said terahertz radiation, which may, for example, be frequency-dependent, wherein exp [ ] characterises an exponential function, wherein i characterises the imaginary unit, wherein $c_0$ characterises the speed of light in vacuum, wherein L characterises a distance between the terahertz device and a reference object, wherein $\Delta D$ characterises an offset between the reference object and the object, wherein $n_A$ characterises an index of refraction of a medium present in the space region, such as air, wherein $\in_A$ characterises an extinction coefficient of the medium present in the space region, wherein $\Phi_0(\omega, x, y, z)$ characterises a phase of the terahertz radiation at the emitter generating said terahertz radiation which is, for example, frequency-dependent, wherein $t_{A1}$ characterises a transmission coefficient at a boundary surface between the medium present in the space region and a layer characterising a surface of the object, wherein $\in_{1A}$ characterises a transmission coefficient at the boundary surface between the layer characterising a surface of the object and the medium present in the space region, wherein $r_{1S}$ characterises a reflection coefficient at a boundary surface between a layer of the object and a substrate, wherein R characterises a reflection index which characterises a number and/or a succession of reflections and/or transmissions of the terahertz radiation, wherein $r_{1A}$ characterises a reflection coefficient at a boundary surface between the layer characterising the surface of the object and the medium present in the space region, wherein $G(D, R, \omega, x, y, z, \alpha, \beta, \Omega)$ characterises the term (T) characterising the THz radiation or a/the weighting factor, wherein D characterises a layer thickness of a layer, wherein n characterises a refraction index of a layer, wherein e characterises an extinction coefficient of a layer, wherein $r_{A1}$ characterises a reflection coefficient at a boundary surface between the medium present in the space region and a layer characterising a surface of the object, wherein $\alpha$ and/or $\beta$ optionally characterise(s) an angular orientation of the terahertz device relative to the object, wherein $\Omega$ optionally characterises properties of a surface of the object, wherein said properties of the surface of the object include, for example, at least one of the following elements: a) a shape of the surface, such as a curvature, b) a roughness of the surface.

In further exemplary embodiments, provision is made for the model to have a second component which characterises a reference measurement on a reference object in a reflection arrangement or a transmission arrangement by means of the terahertz radiation, wherein, for example, the second component may be characterised, in the frequency domain for, for example, the reflection arrangement, on the basis of the following equation:

$$F_S(\omega, x, y, z) =$$

$$I_0(\omega, x, y, z)\exp\left[-i\frac{\omega}{c_0}[(2L)(n_A - i \in_A)] + i\Phi_0(\omega, x, y, z)\right] \cdot r_{AM},$$

wherein $F(\omega, x, y, z)$ characterises a, for example frequency-dependent, field strength of a reference signal, wherein $r_{AM}$ characterises a reflection coefficient at a boundary surface between a medium present in the space region and a surface of the reference object.

In further exemplary embodiments, provision is made for the model to be able to be characterised, for example for a reflection arrangement in a/the frequency domain, for example on the basis of the following equation:

$$
H(\omega) =
$$

$$
\exp\left[-i\frac{\omega}{c_0}(2AD)(n_A - i \in_A)\right] \cdot \left(t_{A1}t_{1A}\Sigma_{R=0}^{\infty}r_{1S}^{R+1}r_{1A}^R G(D, R, \omega, x, y, z, \alpha,\right.
$$

$$
\left.\beta, \Omega)\exp\left[-i\frac{\omega}{c_0}(2R+2)D(n-i\in)\right] + r_{A1}\right)/r_{AM},
$$

wherein H (ω) characterises a transmission function of the terahertz radiation, related for example to a reference measurement.

In further exemplary embodiments, provision is made for the term to be dependent, alternatively or in addition to a) the frequency of the terahertz radiation, and/or b) the spatial extension and/or position of at least one of the two adjacent media, for example along a first spatial direction, on at least one of the following elements: c) the reflection index characterising a number and succession of the reflections and/or transmissions, d) the angular orientation of the terahertz device with respect to the object and/or the reference object, e) the distance, for example, between the at least one terahertz device and/or the at least one object, f) the property of a surface of the at least one object, such as a shape of the surface and/or a roughness of the surface.

In further exemplary embodiments, provision is made for the model, by using, for example, the term and/or the weighting factor, to model a distance-dependent spectral change of a transmission function of the terahertz radiation as a distance-dependent and/or depth-dependent attenuation and/or amplification.

In further exemplary embodiments, provision is made for the model, by using, for example, the term and/or the weighting factor, to model a angle-dependent spectral change of a transmission function of the terahertz radiation as an angle-dependent attenuation and/or amplification.

In further exemplary embodiments, provision is made for the model, by using, for example, the term and/or the weighting factor, models a spectral change of a transmission function of the terahertz radiation on the basis of at least one property of a/the surface of the at least one object, as based on, for example, a shape of the surface and/or a roughness of the surface.

In further exemplary embodiments, provision is made for the model to include an object having several layers of different media, wherein, for example, the model characterises at least one of the following elements: a) reflections and/or transmissions of the terahertz radiation in the object, such as between adjacent layers, b) multiple reflections and/or multiple transmissions of the terahertz radiation in the object, c) virtual reflection points and/or virtual transmission points in the object, which may be characterised, for example, by a reflection index, d) a coherent superposition of the different reflections and/or transmissions of the terahertz radiation in the object.

In further exemplary embodiments, provision is made for the method to further include: Determining the term and/or individual values of the term on the basis of an optical model of a system characterising the terahertz device and the object and/or reference object as well as, optionally, an ambient medium surrounding the terahertz device and the object or reference object, wherein, for example, the optical model characterises a spectral transmission function of the terahertz radiation, for example within the system.

In further exemplary embodiments, provision is made for the method to further include: Determining the term and/or individual values of the term on the basis of an optical model of a system characterising the terahertz device and the object and/or reference object as well as, optionally, an ambient medium surrounding the terahertz device and the object or reference object, wherein the optical model characterises an amplitude and phase across the spatial extension of the terahertz radiation, for example within the system.

In further exemplary embodiments, provision is made for the optical model takes into account diffraction effects of the terahertz radiation.

In further exemplary embodiments, provision is made for the method to further include: Determining the optical model on the basis of a modelisation by means of a) ray tracing and/or b) a description based on the Theory of Diffraction, such as by means of a diffraction integral, for example Collins' integral, and/or c) a parametric calculation having model function, and, optionally, calibrating said optical model, wherein, for example, determining and/or calibrating the optical model is/are carried out by a frequency-resolved technique.

In further exemplary embodiments, provision is made for the method to further include: Calibrating the optical model, for example with respect to the spectral transmission function and/or the spatial amplitude and/or phase, on the basis of at least one of the following elements: a) an angle between an optical axis of the terahertz device and a surface normal of the object or reference object, b) a distance between the terahertz device and a surface of the object or reference object, c) a property of a/the surface of the at least one object and/or of a reference object, for example on the basis of a shape, for example a curvature, of the surface and/or a roughness of the surface, d) a frequency of the terahertz radiation.

In further exemplary embodiments, provision is made for the method to further include: Varying the spatial position of reflection points and/or transmission points characterised by the model, deriving a property such as the thickness of at least one layer of a medium of the object on the basis of said varying, wherein, for example, at least one of the following elements is used for said deriving: a) performing a correlation method, b) performing a method for pattern recognition, c) determining peaks and/or dips, d) utilising a machine learning method, e) performing a fitting method, for example by adapting the model, for example on the basis of a least-squares method.

In further exemplary embodiments, provision is made for the value and/or for values of the term or weighting factor not to be varied when, for example, varying the spatial position of reflection points and/or transmission points in a process of, for example, determining a thickness of a layer of e. g. the object.

In further exemplary embodiments, provision is made for the value and/or for values of the term or weighting factor to be varied when, for example, varying the spatial position of reflection points and/or transmission points in a process of, for example, determining a thickness of a layer of e. g. the object.

In further exemplary embodiments, provision is made for the value and/or for values of the term or weighting factor to be interpolated when, for example, varying the spatial position of reflection points and/or transmission points, by utilising, for example, available values. In further exemplary embodiments, provision is made for the method to further include: Determining, for example precalculating, at least one component of the model and/or the optical model as well as, optionally, at least temporarily storing results of said determining, for example precalculating, wherein, for example, said results are stored in a database.

In further exemplary embodiments, provision is made for the method to further include: Determining reference data for several different spatial arrangements of the terahertz device and the object or reference object relative to each other, including, for example, disposing the terahertz device and the object and/or reference object relative to each other in a given arrangement and determining the reference data for said given arrangement, as well as, optionally repeating the steps of disposing and determining until, for example, a predeterminable termination criterion has been reached, wherein said disposing includes, for example, positioning the terahertz device and/or the object or reference object by means of a positioning device such as a robot.

In further exemplary embodiments the reference data can be stored at least intermittently by means of at least one database.

In further exemplary embodiments, provision is made for the method to further include: Determining, for example using sensors, e. g. additional sensors, at least one of the following elements: a) the distance between the terahertz device and the object or reference object, b) the angular orientation, for example in a one-dimensional or two-dimensional arrangement, between the terahertz device and the object or reference object, c) the shape, for example the curvature, of a/the surface of the object or reference object. In further exemplary embodiments, optical sensors (e. g. for laser distance measurement and/or laser angle measurement) and/or acoustic sensors (e. g. ultrasonic sensors) and/or sensors based on the utilisation of electromagnetic waves, such as radar sensors, may be used for this purpose.

In further exemplary embodiments, provision is made for the method to further include: Utilising the distance and/or the angular orientation and/or the shape for the model, for example for determining the term and/or individual values of the term.

In further exemplary embodiments, provision is made for the method to further include: Determining whether at least one region of interest, for example a reflection point, is located within a parameter range (characterisable, for example, by a distance range and/or an angle range) for which values of the term, and/or the reference data, which may, for example, be characterised via calculated and/or calibrated transmission functions, are available, and, on the basis of said determining, changing a spatial arrangement, for example a distance and/or an angle, by means of, for example, at least one positioning device—(e. g. a robot), wherein, for example, said changing is repeated until the region of interest is located within said parameter range, and, optionally, Performing an evaluation.

Further exemplary embodiments refer to a device for performing the method according to these embodiments.

Further exemplary embodiments refer to a machine-readable storage medium comprising instructions which, when executed by a computer, cause the latter to execute the method according to the embodiments.

Further exemplary embodiments refer to a computer programme comprising instructions which, when said programme is executed by a computer, cause the latter to execute the method according to the embodiments.

Further exemplary embodiments refer to a data carrier signal which transmits and/or characterises said computer programme according to the embodiments.

Further exemplary embodiments refer to a utilisation of the method according to the embodiments and/or of the device according to the embodiments and/or of the machine-readable storage medium according to the embodiments and/or of the computer programme according to the embodiments and/or of the data carrier signal according to the embodiments for at least one of the following elements: a) determining at least one property of the object, for example a layer thickness of at least one layer of the object, b) enhancing a precision of the model, for example by taking into account a propagation of the terahertz radiation in the form of non-planar, for example not exclusively planar, waves, c) taking into account a dependency of a spectral transmission function on a distance to the terahertz device, d) taking into account a dependency of a spectral transmission function on an angle with respect to the terahertz device, e) taking into account a property of a/the surface of the at least one object or of a reference object, for example on the basis of a shape, for example a curvature, of the surface and/or a roughness of the surface.

Further characteristics, usage options, and advantages may be seen in the following description of exemplary embodiments which are represented in the figures of the drawing. Any of the characteristics described or represented herein, on their own or in any combination, form the object of exemplary embodiments, regardless of the ways they are summarised in the claims or in the back-references thereof, and regardless of their formulation and/or representation in the description and/or in the drawing.

Figure 2:
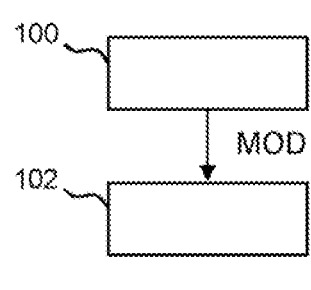
Figure 3:
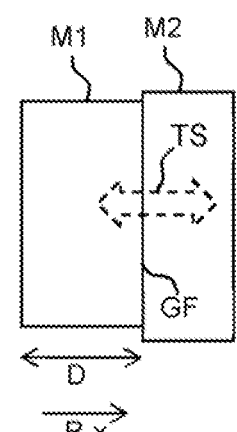
Figure 4A:
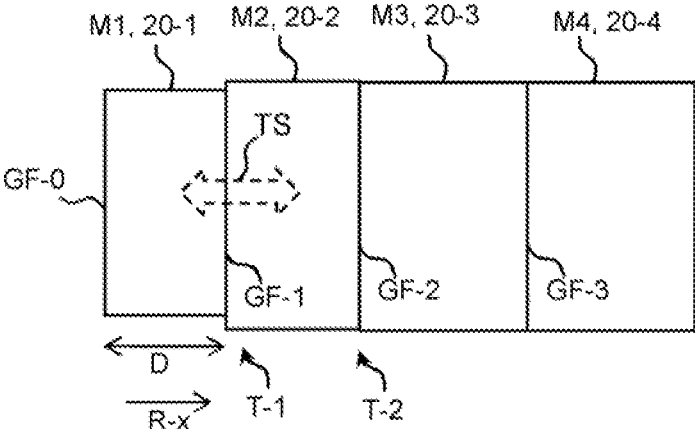
Figure 4B:
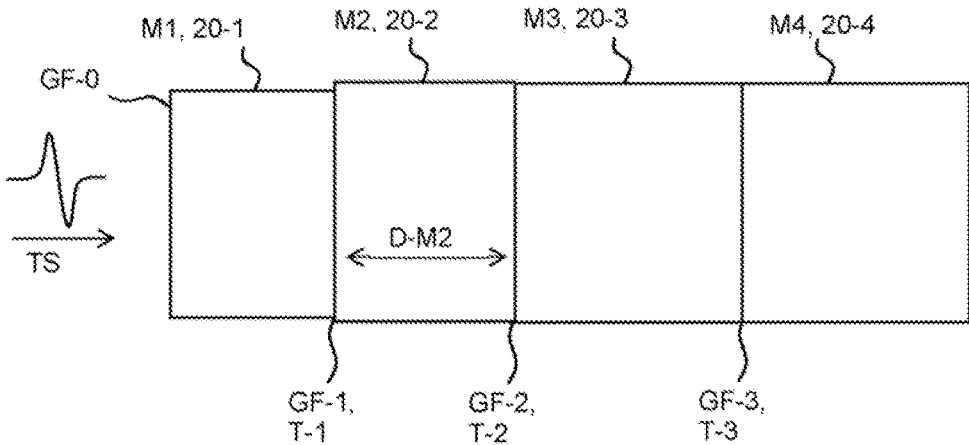
Figure 5:
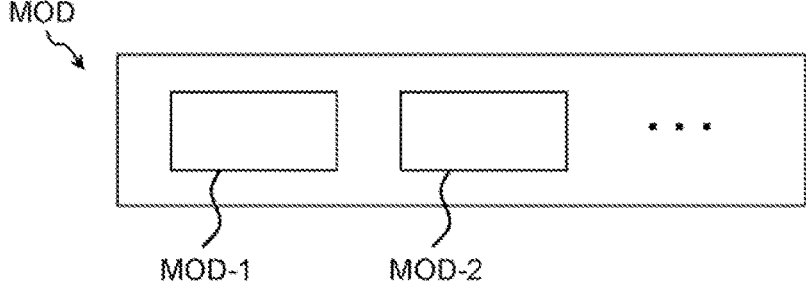
Figure 6:
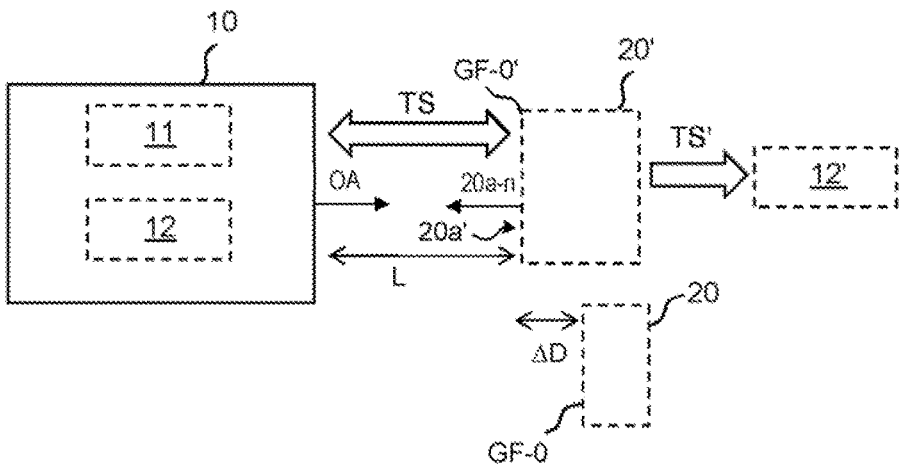
Figures 7, 8, 9:
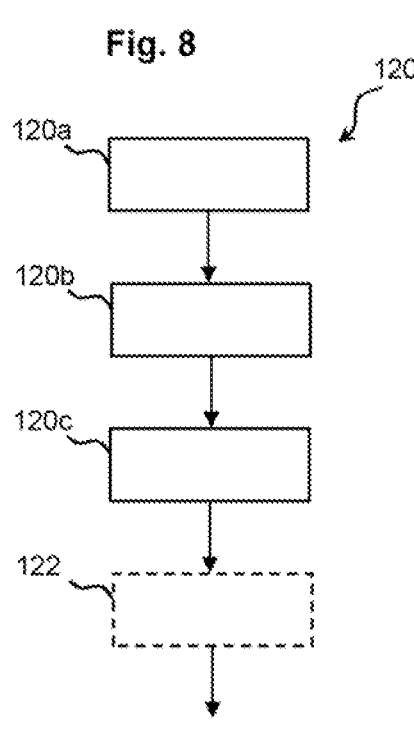
Figure 10:
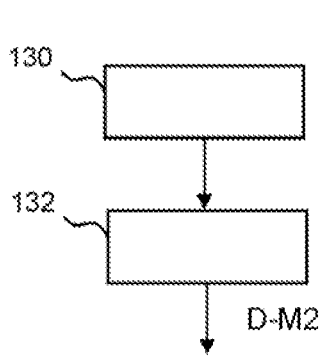
Figure 11:
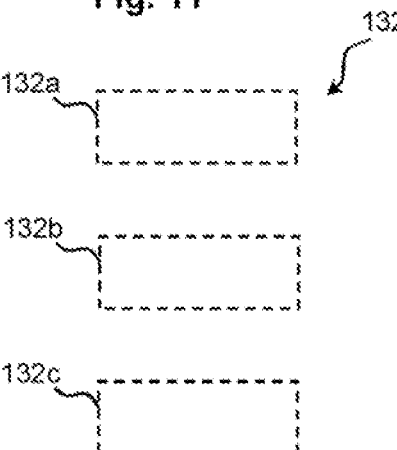
Figure 12:
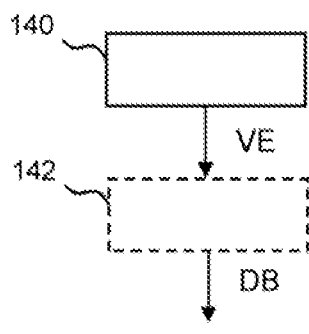
Figure 13:
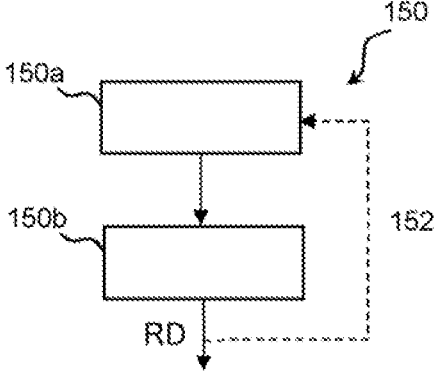
Figure 14:
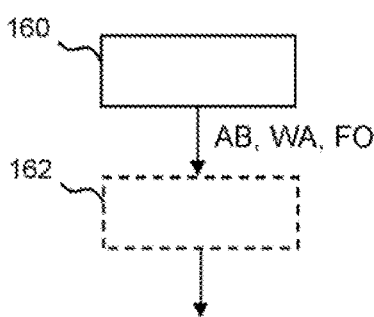
Figure 15:
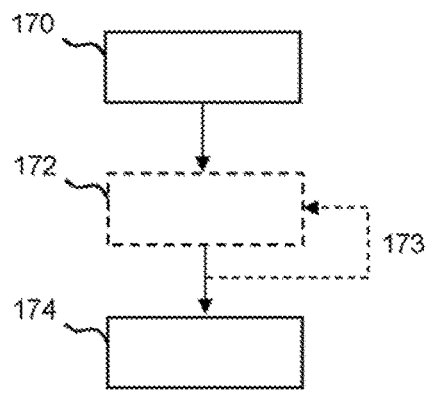
Figure 16:
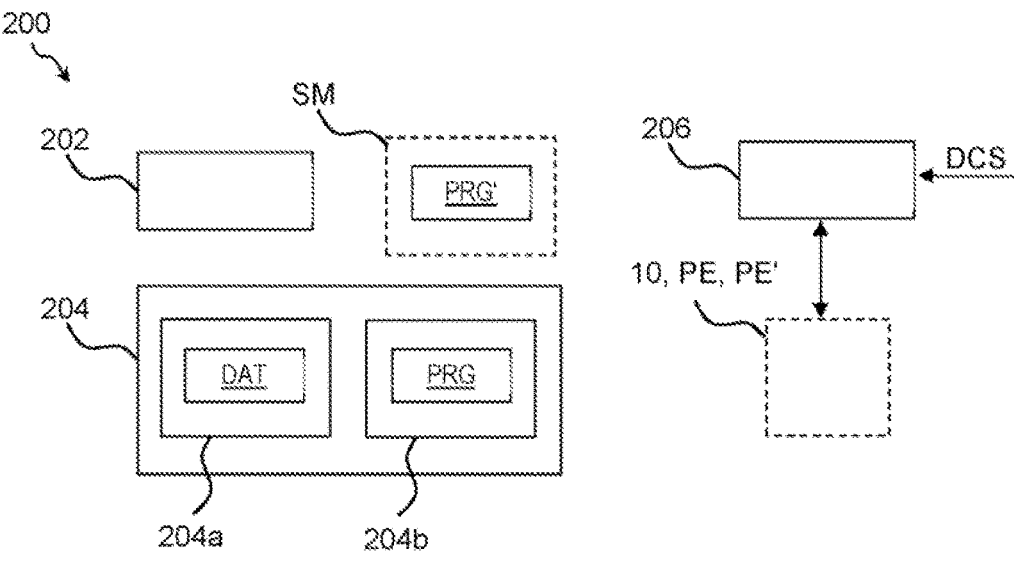
Figure 17:
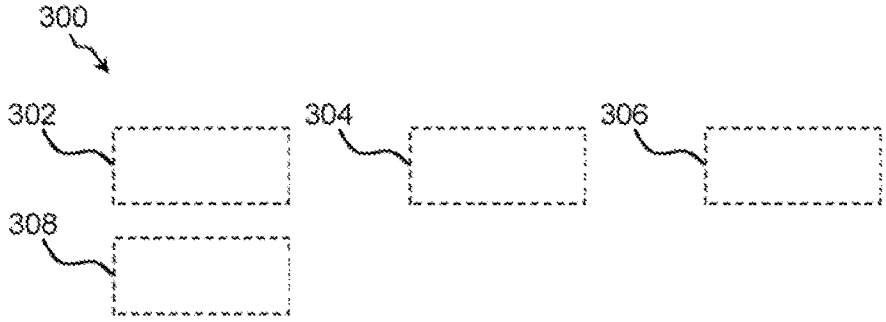
Figure 18:
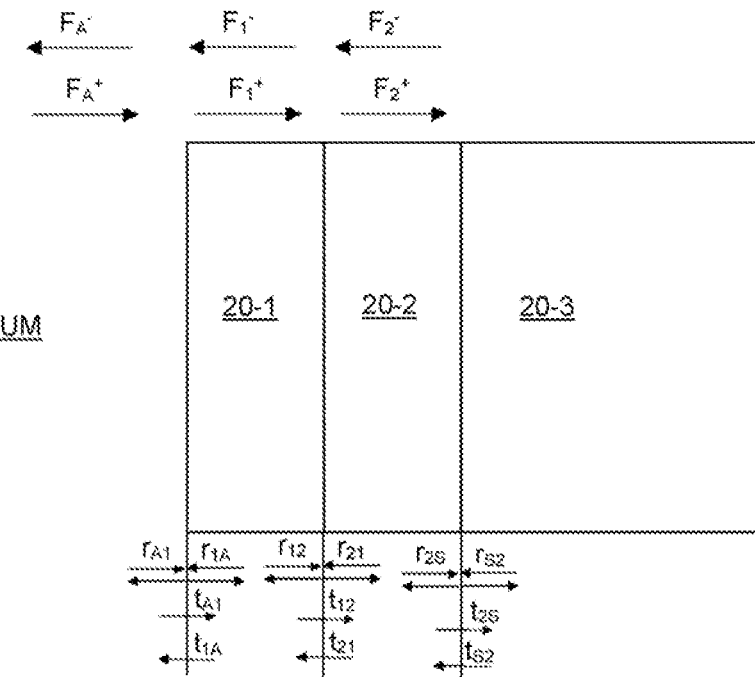

In the drawing:

FIG. 1 schematically shows a simplified block diagram of a THz device to be used with exemplary embodiments, FIG. 2 schematically shows a simplified flow diagram according to further exemplary embodiments, FIG. 3 schematically shows a simplified block diagram according to further exemplary embodiments, FIG. 4A schematically shows a simplified block diagram according to further exemplary embodiments, FIG. 4B schematically shows a simplified block diagram according to further exemplary embodiments, FIG. 5 schematically shows a simplified block diagram according to further exemplary embodiments, FIG. 6 schematically shows a simplified block diagram according to further exemplary embodiments, FIG. 7 schematically shows a simplified flow diagram according to further exemplary embodiments, FIG. 8 schematically shows a simplified flow diagram according to further exemplary embodiments, FIG. 9 schematically shows a simplified block diagram according to further exemplary embodiments, FIG. 10 schematically shows a simplified flow diagram according to further exemplary embodiments, FIG. 11 schematically shows a simplified flow diagram according to further exemplary embodiments, FIG. 12 schematically shows a simplified flow diagram according to further exemplary embodiments, FIG. 13 schematically shows a simplified flow diagram according to further exemplary embodiments, FIG. 14 schematically shows a simplified flow diagram according to further exemplary embodiments, FIG. 15 schematically shows a simplified flow diagram according to further exemplary embodiments, FIG. 16 schematically shows a simplified block diagram according to further exemplary embodiments, FIG. 17 schematically shows aspects of usage options according to further exemplary embodiments, and FIG. 18 schematically shows a simplified block diagram according to further exemplary embodiments.

FIG. 1 schematically shows a block diagram of a THz device 10 suitable to be used with a method according to exemplary embodiments. The THz device 10 is, e. g., configured for emitting and/or receiving THz radiation TS, for example, THz radiation TS which has been reflected at, or transmitted in, an object 20.

Further exemplary embodiments, FIG. 2, relate to a method of processing data DAT (FIG. 1) that is associated with a model MOD characterising a propagation of terahertz (THz) radiation TS within a space region RB, wherein the space region RB includes the at least one terahertz device 10 for emitting and/or receiving the terahertz radiation TS and/or the at least one object 20 that may be exposed to the terahertz radiation TS, wherein the method includes: Providing 100 (FIG. 2) the model MOD, Characterising (for example Describing) 102, by means of said model MOD, a propagation of the terahertz radiation TS in the region of at least one boundary surface GF, cf. FIG. 3, between two adjacent media M1, M2, in the space region RB, wherein the model MOD includes a term T characterising the THz radiation TS and depending on at least one of the following elements: a) the frequency of the terahertz radiation TS, b) the spatial extension D and/or position of at least one of the two adjacent media M1, M2, for example along a first spatial direction R-x.

In further exemplary embodiments, the two media M1, M2 adjacent within the space region RB may be matter of the THz device 10 (e. g. material of a THz emitter (not shown in FIG. 1) and/or of an optional, ray-forming THz optical system, or the like) and/or a medium present in the environment UM of the space region RB, such as ambient air and/or dry air and/or protective gas, etc., and/or matter of the object 20, see the exemplary layer structure M1, M2 according to FIG. 3.

In further exemplary embodiments, the spatial extension D may be, for example, a thickness, such as a layer thickness of a layer M1 of the object 20.

FIG. 3 shows an exemplary structure of, for example, the object 20 according to FIG. 1, wherein the given structure has, for example, four layers 20-1, 20-2, 20-3, 20-4 consisting each of a corresponding material M1, M2, M3, M4. The reference sign GF-0 symbolises a boundary surface between the medium M1 of the layer 20-1 and an ambient medium present in the environment UM (FIG. 1), the reference sign GF-1 symbolises a boundary surface between the medium M1 of the layer 20-1 and the medium M2 of the layer 20-2, the reference sign GF-2 symbolises a boundary surface between the medium M2 of the layer 20-2 and the medium M3 of the layer 20-3, and the reference sign GF-3 symbolises a boundary surface between the medium M3 of the layer 20-3 and the medium M4 of the layer 20-4. The THz radiation propagated within the structure according to FIG. 4A is symbolised in FIG. 4A by the dashed block arrow TS.

FIG. 4B shows an example of a structure similar to the construction according to FIG. 4A, with details of some reflections and/or transmissions of components of the THz radiation TS, which is irradiated, for example, in the form of a THz pulse being described by way of example in the following.

In further exemplary embodiments, the medium M1 may represent, for example, an ambient medium present in the environment UM between the THz device 10 and the object (20).

In further exemplary embodiments, the medium M4 may, for example, represent a metallic substrate upon which—in the present example two—layers 20-2, 20-3 made of other media M2, M3 may be disposed, for example, layers made of a coating material including polymer, e. g. paint for coating said substrate M4.

In further exemplary embodiments, provision is made for the model MOD (FIG. 1) to characterise at least one reflection $r_0$, $r_1$, $r_2$, $r_0'$, $r_1'$ (FIG. 4B) and/or transmission $t_0$, $t_1$, $t_{0'}$, $t_{1'}$, of the terahertz radiation TS on the at least one boundary surface GF-1, GF-2, GF-3 between the at least two media M1, M2, M3, M4, wherein, for example, the model MOD characterises a plurality of reflections and/or transmissions of the terahertz radiation TS on the at least two boundary surfaces between the various different media, wherein, for example, the term T (FIG. 1) characterising the terahertz radiation has a different value T–1, T–2 (FIG. 4A), T–1, T–2, T–3 (FIG. 4B) for each of the at least two boundary surfaces.

In further exemplary embodiments, provision is made for the model MOD to characterise a, or the plurality of, reflection(s) and/or transmission(s) of the terahertz radiation TS on a plurality of boundary surfaces GF-0, GF-1, GF-2, GF-3 between every two adjacent media M1, M2, M3, M4 (FIG. 4A, 4B) in the space region RB (FIG. 1) by means of a coherent superposition function, wherein the term T is provided as a weighting factor G, for example a weighting factor other than one, for at least some components of said coherent superposition function.

In further exemplary embodiments, FIG. 5, provision is made for the model MOD to have a first component MOD-1 which characterises a sample measurement on the object 20 in a reflection arrangement or a transmission arrangement by means of the terahertz radiation TS, wherein, for example, the first component MOD-1 may be characterised, in a frequency domain in, for example, the reflection arrangement, on the basis of the following equation:

$$F_S(\omega, x, y, z) =$$

$$I_0(\omega, x, y, z)\exp\left[-i\frac{\omega}{c_0}[2(L + \Lambda D)(n_A - i \in_A)] + i\Phi_0(\omega, x, y, z)\right] \cdot$$

$$\left(t_{A1}t_{1A}\Sigma_{R=0}^{\infty}r_{1S}^{R+1}r_{1A}^R G(D, R, \omega, x, y, z, \alpha, \beta, \Omega)\right.$$

$$\left.\exp\left[-i\frac{\omega}{c_0}(2R + 2)D(n - i \in)\right] + r_{A1}\right),$$

wherein $F_S(\omega$, x, y, z) characterises a field strength of a sample signal which may, for example, be frequency-dependent (and may, for example, be received by the THz device 10 as a component of the THz radiation TS reflected at, or transmitted in, the object 20), wherein $\omega$ characterises angular frequency $f$ associated with a frequency of the terahertz radiation TS (e. g. according to $\omega=2\pi f$), wherein x characterises a first space coordinate, wherein y characterises a second space coordinate, wherein z characterises a third space coordinate, wherein $I_0(\omega$, x, y, z) characterises a field strength of the terahertz radiation TS at an emitter 11 (FIG. 6) generating said terahertz radiation TS, which may, for example, be frequency-dependent, wherein exp [ ] characterises an exponential function, wherein i characterises the imaginary unit, wherein $c_0$ characterises the speed of light in vacuum, wherein L characterises a distance (FIG. 6) between the terahertz device 10 and a reference object 20' (having, for example, a known structure, such as a metallic "layer"), wherein ΔD characterises an offset between the reference object 20' and the object 20, wherein n A characterises an index of refraction of a medium present in the space region RB (FIG. 1) such as air (e. g, ambient air, dry air), wherein $\in_A$ characterises an extinction coefficient of the medium present in the space region RB, wherein $\Phi_0(\omega, x, y, z)$ characterises a phase of the terahertz radiation TS at the emitter 11 generating said terahertz radiation TS which is, for example, frequency-dependent, wherein $t_{A1}$ characterises a transmission coefficient at a boundary surface GF-0 (FIG. 4A) between the medium present in the space region RB and a layer 20-1 characterising a surface 20a of the object 20, wherein $t_{1A}$ characterises a transmission coefficient at the boundary surface between the layer 20-1 characterising a surface 20a of the object 20 and the medium present in the space region RB, wherein $r_{1S}$ is characterises a reflection coefficient at a boundary surface GF-3 between a layer 20-3 of the object 20 and a substrate 20-4, wherein R characterises a reflection index which characterises a number and/or a serial order of reflections and/or transmissions of the terahertz radiation TS, wherein $r_{1A}$ characterises a reflection coefficient at a boundary surface between the layer characterising the surface 20a of the object 20 and the medium present in the space region RB, wherein G(D, R, ω, x, y, z, α, β, Ω) characterises the term T (FIG. 1) characterising the THz radiation TS or a/the weighting factor (weighting, for example, the summands of the expression $$\Sigma_{R=0}^{\infty} r_{1S}^{R+1} r_{1A}^R G(D, R, \omega, x, y, z, \alpha, \beta, \Omega) \exp\left[-i\frac{\omega}{c_0}(2R+2)D(n-i\in)\right],$$

wherein D characterises a layer thickness of a layer 20-1, 20-2, wherein n characterises a refraction index of a layer 20-1, 20-2, . . . , wherein $\in$ characterises an extinction coefficient of a layer 20-1, 20-2, . . . , wherein $r_{A1}$ characterises a reflection coefficient at a boundary surface between the medium present in the space region RB and a layer characterising a surface 20a of the object 20, wherein α and/or β optionally characterise(s) an angular orientation (in, for example one or two spatial directions) of the terahertz device 10 relative to the object 20, wherein Ω optionally characterises properties of a surface 20a of the object 20, wherein said properties of the surface 20a of the object 20 include, for example, at least one of the following elements: a) a shape of the surface 20a, such as a curvature, b) a roughness of the surface 20a.

In further exemplary embodiments, FIG. 5, provision is made for the model MOD to have a second component MOD-2 which characterises a reference measurement at a reference object 20' in a reflection arrangement or a transmission arrangement by means of the terahertz radiation TS, wherein the second component MOD-2 may be characterised, in a frequency domain in, for example, the reflection arrangement, on the basis of the following equation:

$$F(\omega, x, y, z) =$$

$$I_0(\omega, x, y, z)\exp\left[-i\frac{\omega}{c_0}[2L(n_A - i\in_A)] + i\Phi_0(\omega, x, y, z)\right]\cdot r_{AM},$$

wherein F(ω, x, y, z) characterises a, for example frequency-dependent, field strength of a reference signal (which may, for example, be received by the THz device 10 as a component of the THz radiation TS reflected at the reference object 20'), wherein $r_{AM}$ characterises a reflection coefficient at a boundary surface between the medium present in the space region RB and a surface 20a' of the reference object 20'.

In further exemplary embodiments, provision is made for the model MOD (FIGS. 1, 5) to be able to be characterised, for example for a reflection arrangement (FIG. 6) in the frequency domain, for example on the basis of the following equation:

$$H(\omega) =$$

$$\exp\left[-i\frac{\omega}{c_0}(2\Lambda D)(n_A - i\in_A)\right]\cdot\left(t_{A1}t_{1A}\Sigma_{R=0}^{\infty} r_{1S}^{R+1} r_{1A}^R G(D, R, \omega, x, y, z, \alpha,\right.$$

$$\left.\beta, \Omega)\exp\left[-i\frac{\omega}{c_0}(2R+2)D(n-i\in)\right] + r_{A1}\right)/r_{AM},$$

wherein H (ω) characterises a transmission function of the terahertz radiation TS, related for example to a reference measurement.

In further exemplary embodiments, provision is made for the term T and/or the weighting factor G (characterisable, for example, by the formula symbol G(D, R, ω, x, y, z, α, β, Ω) to be dependent, alternatively or in addition to a) the frequency and/or angular frequency of the terahertz radiation TS, and/or b) the spatial extension and/or position (characterisable, for example, by the coordinates x, y, z) of at least one of the two adjacent media, for example along a first spatial direction R-x, on at least one of the following elements: c) the reflection index R characterising a number and succession of the reflections and/or transmissions, d) the angular orientation of the terahertz device 10 with respect to the object 20 (characterisable, for example, by at least one angle α, β, between, for example, an optical axis OA of the THz device 10 and a normal vector 20a-n of the surface 20a, cf. FIG. 9), e) the distance L, for example, between the at least one terahertz device 10 and/or the at least one object 20, f) the property of a surface 20a of the at least one object 20, such as a shape of the surface 20a and/or a roughness of the surface 20a.

In further exemplary embodiments, the sum in the following part of the equation is not evaluated until the upper boundary "infinity", mentioned here by way of example, but rather until a predeterminable finite value $R_{max}$ of the reflection index. Thus, in further exemplary embodiments, the following applies $$F_S(\omega, x, y, z) =$$

$$I_0(\omega, x, y, z)\exp\left[-i\frac{\omega}{c_0}[2(L + \Lambda D)(n_A - i\in_A)] + i\Phi_0(\omega, x, y, z)\right]\cdot$$

$$\left(t_{A1}t_{1A}\Sigma_{R=0}^{Rmax} r_{1S}^{R+1} r_{1A}^R G(D, R, \omega, x, y, z, \alpha, \beta, \Omega)\right.$$

$$\left.\exp\left[-i\frac{\omega}{c_0}(2R+2)D(n-i\in)\right] + r_{A1}\right),$$

instead of $$F_S(\omega, x, y, z) =$$

$$I_0(\omega, x, y, z)\exp\left[-i\frac{\omega}{c_0}[2(L + \Lambda D)(n_A - i\in_A)] + i\Phi_0(\omega, x, y, z)\right]\cdot$$

$$\left(t_{A1}t_{1A}\Sigma_{R=0}^{\infty} r_{1S}^{R+1} r_{1A}^R G(D, R, \omega, x, y, z, \alpha, \beta, \Omega)\right.$$

-continued $$\exp\left[-i\frac{\omega}{c_0}(2R+2)D(n-i\in)\right]+r_{A1}\right)$$

and/or the following applies $H(\omega) =$ $$\exp\left[-i\frac{\omega}{c_0}(2\Lambda D)(n_A-i\in_A)\right]\cdot\left(t_{A1}t_{1A}\Sigma_{R=0}^{Rmax}r_{1S}^{R+1}r_{1A}^R G(D, R, \omega, x, y, z, \alpha,\right.$$

$$\left.\beta, \Omega)\exp\left[-i\frac{\omega}{c_0}(2R+2)D(n-i\in)\right]+r_{A1}\right)/r_{AM},$$

instead of $H(\omega) =$ $$\exp\left[-i\frac{\omega}{c_0}(2\Lambda D)(n_A-i\in_A)\right]\cdot\left(t_{A1}t_{1A}\sum_{R=0}^{\infty}r_{1S}^{R+1}r_{1A}^R G(D, R, \omega, x, y, z,\right.$$

$$\left.\alpha, \beta, \Omega)\exp\left[-i\frac{\omega}{c_0}(2R+2)D(n-i\in)\right]+r_{A1}\right)/r_{AM}.$$

In further exemplary embodiments, a value for $R_{max}$ may be selected for example on the basis of at least one of the following elements: a) the desired precision, b) the available computational power.

In further exemplary embodiments, provision is made for the model MOD, by using, for example, the term T and/or the weighting factor G( ), to model a distance-dependent spectral change of a transmission function of the terahertz radiation TS as a distance-dependent and/or depth-dependent attenuation and/or amplification.

In further exemplary embodiments, provision is made for the model MOD, by using, for example, the term T and/or the weighting factor G( ), to model an angle-dependent spectral change of a transmission function of the terahertz radiation TS as an angle-dependent attenuation and/or amplification.

In further exemplary embodiments, provision is made for the model (MOD), by using, for example, the term (T) and/or the weighting factor G ( ), to model a spectral change of a transmission function of the terahertz radiation TS on the basis of at least one property of a/the surface 20a of the at least one object 20, as based on, for example, a shape of the surface 20a and/or a roughness of the surface 20a.

In further exemplary embodiments, the model MOD enables a modelling of the propagation of the THz radiation TS which may be referred to as a "differential modelisation". It is thus possible, for example, to dedicatedly take into account, for modelisation purposes, a path of an individual reflection (and/or, for that matter, e. g. of any individual reflection).

In further exemplary embodiments, the model MOD enables an individual description of possible combinations of reflections and/or transmissions of a (partial) pulse of the THz radiation TS, e. g. up to a predeterminable maximum order which may be characterised, for example, by the value $R_{max}$. In further exemplary embodiments, thickness-dependent distances of individual reflection points (e. g. in the region of the boundary surfaces) are defined by using for each such point a corresponding trajectory. Thus, it is possible, in further exemplary embodiments, to efficiently integrate sample-derived geometrical effects of the object 20 (so that in further exemplary embodiments distance-dependent spectral changes of the transmission function may be modelled as a depth-dependent attenuation).

In further exemplary embodiments, provision is made for the model MOD to include an object 20 having several layers 20-1, 20-2, 20-3, 20-4 (FIG. 4B) of at least partially different media M1, M2, M3, M4, wherein, for example, the model MOD characterises at least one of the following elements: a) reflections and/or transmissions of the terahertz radiation TS in the object 20, such as between adjacent layers, b) multiple reflections and/or multiple transmissions of the terahertz radiation TS in the object 20, c) virtual reflection points and/or virtual transmission points in the object 20, which may be characterised, for example, by a/the reflection index R, d) a coherent superposition of the different reflections and/or transmissions of the terahertz radiation TS in the object 20.

In further exemplary embodiments, FIG. 7, provision is made for the method to further include: Determining (110) the term T and/or individual values T–1, T–2, T–3, . . . of the term T on the basis of an optical model MOD-OPT of a system SYS (FIG. 1) characterising the terahertz device 10 and the object and/or reference object 20' (FIG. 6), and, optionally, an ambient medium UM surrounding the terahertz device 10 and the object 20 or reference object 20', wherein, for example, the optical model MOD-OPT characterises a spectral transmission function of the terahertz radiation TS, for example within the system SYS.

In other exemplary embodiments, measurements may be performed using the principle of reflection mentioned further above by way of example. The dashed block 12 of FIG. 6, for example, symbolises an optional detector for detecting THz radiation TS, e. g. THz radiation reflected at the (reference) object 20, 20'.

In further exemplary embodiments, measurements may be performed alternatively to, or in addition to, the principle of reflection mentioned further above by way of example, by using a principle of transmission, cf. the optional THz detector 12' in FIG. 6 at the right, which is capable, for example, of detecting components TS' of the THz radiation TS which have been transmitted by the (reference) object 20, 20'. For embodiments based upon measurements according to the principle of transmission, the aspects of the model MOD described herein and a utilisation of the term T will apply in a corresponding manner.

In further exemplary embodiments, FIG. 7, provision is made for the method to further include: Determining 110 the term T and/or individual values T–1, T–2, T–3, . . . of the term T on the basis of an optical model MOD-OPT of a system SYS characterising the terahertz device 10 and the object 20 and/or reference object 20' as well as, optionally, an ambient medium UM surrounding the terahertz device 10 and the object 20 or reference object 20', wherein the optical model MOD-OPT characterises an amplitude and phase across the spatial extension of the terahertz radiation TS, for example within the system SYS.

In further exemplary embodiments, provision is made for the optical model MOD-OPT to take into account diffraction effects of the terahertz radiation TS.

An optional step 112 of FIG. 7 symbolises a utilisation of the term T, or rather of its values, for e. g. determining and/or utilising the model MOD.

In further exemplary embodiments, FIG. 8, provision is made for the method to further include: Determining 120 the optical model MOD-OPT on the basis of a modelisation by means of a) ray tracing 120a and/or b) a description based on the Theory of Diffraction 120b, such as by means of a diffraction integral, for example Collins' integral, and/or c)

a parametric calculation 120c having model function, and, optionally, calibrating 122 said optical model MOD-OPT, wherein, for example, determining 120 and/or calibrating 122 the optical model MOD-OPT is/are carried out by a frequency-resolved technique.

In further exemplary embodiments, provision is made for the method to further include: Calibrating 122 the optical model MOD-OPT, for example with respect to the spectral transmission function and/or the spatial amplitude and/or phase, on the basis of at least one of the following elements: a) an angle $\alpha(,\beta)$ between an optical axis OA (FIG. 9) of the terahertz device 10 and a surface normal 20a-n of the object 20 or reference object 20', b) a distance L between the terahertz device 10 and a surface 20a, 20a' of the object 20 or reference object 20', c) a property of a/the surface 20a of the at least one object 20 and/or of a reference object 20', for example on the basis of a shape FO, for example a curvature, of the surface 20a, 20a' and/or a roughness of the surface 20a, 20a', d) a frequency of the terahertz radiation TS.

The dashed block 11 of FIG. 9 symbolises an optional emitter for generating the THz radiation TS, and the dashed block 12 of FIG. 9 symbolises an optional detector for detecting THz radiation TS, for example portions of the THz radiation TS which have been reflected or transmitted at the object 20 and/or at the reference object 20'.

In further exemplary embodiments, a calculation aimed at determining the optical model MOD-OPT is performed by starting, for example, at a "starting plane" (characterisable, for example, by the THz emitter 11) and extending to the object 20 (including, for example, a variation of a position of said object 20 in the local range and/or angle range) via an optional optical (THz) system (not shown), which may be provided where appropriate, and returning from the object 20 to the THz detector 12 ("target plane") via said optional optical system.

In further exemplary embodiments, it is possible, by varying the geometry (taking into account disturbances regarding shape (of the object 20) and/or distance and angle in one or in two spatial directions), to calculate, by a frequency-resolved technique, transfer functions for THz signals on the basis of which it is possible, in further exemplary embodiments, to determine for example the term T.

In further exemplary embodiments, it is possible for a reception path and a transmission path to be separately calculated in advance and to be stored, for example, in a database DB. A reception path may be characterised, for example, by the distance from the object 20 to the THz detector 12. A transmission path may be characterised, for example, by the distance from the THz emitter 11 to the object 20.

In further exemplary embodiments, the model used as the optical model MOD-OPT may, for example, be a parametric optical model based, e. g., upon ABCD matrices, which characterises, for example, moments of the power density distribution and/or a propagation of said moments.

In further exemplary embodiments, the model used as the optical model MOD-OPT may, for example, be a numerical optical model.

In further exemplary embodiments, FIG. 10, provision is made for the method to further include: Varying 130 the spatial position of reflection points and/or transmission points (e. g. in the region of the boundary surfaces GF-0, GF-1, . . . ) characterised by the model MOD, deriving 132 a property D-M2 (FIG. 4B) such as the thickness D-M2 of at least one layer 20-2 of a medium M2 of the object 20 on the basis of said varying 130, wherein, for example, at least one of the following elements is used for said deriving 132, FIG. 11: a) performing 132a a correlation method, b) performing 132b a method for pattern recognition, c) determining 132c peaks and/or dips, d) utilising 132d a machine learning method, e) performing 132e a fitting method.

To put it another way, in further exemplary embodiments, at least one parameter of the model MOD is being modified until, for example, a transmission function for the THz radiation TS $$H(\omega) =$$

$$\exp\left[-i\frac{\omega}{c_0}(2\Lambda D)(n_A - i \in_A)\right] \cdot \left(t_{A1}t_{1A}\sum\nolimits_{R=0}^{Rmax} r_{1S}^{R+1}r_{1A}^R G(D, R, \omega, x, y, z,\right.$$

$$\left.\alpha, \beta, \Omega)\exp\left[-i\frac{\omega}{c_0}(2R + 2)D(n - i \in)\right] + r_{A1}\right)/r_{AM}$$

which may be characterised by the model, corresponds, with a predefinable tolerance measure, to e. g. at least one transmission function for the THz radiation TS that is determinable, and/or has been determined, by measurement on the object 20, which may be performed, in further exemplary embodiments, for example by said deriving 132 in accordance with at least one of the aspects a) to e).

In further exemplary embodiments, FIG. 12, provision is made for the method to further include: Determining 140, for example precalculating, at least one component of the model and/or the optical model as well as, optionally, at least temporarily storing 142 results VE of said determining 140, for example precalculating, wherein, for example, said results VE are stored in a database DB (see also FIG. 1).

In further exemplary embodiments, precalculating 140 the model MOD and/or at least a component MOD-1, MOD-2 of the model MOD, e. g. for a plurality of possible parameter values (e. g. layer thicknesses D-M2 of different layers of the object 20) makes it possible to efficiently determine properties of the object 20 (e. g. a layer thickness and/or layer thicknesses D-M2 of a layer 20-2), for example by comparing a transmission function HO for the THz radiation TS with at least one possible transmission function determined in advance by said precalculating 140.

In further exemplary embodiments, FIG. 13, provision is made for the method to further include: Determining 150 reference data RD for several different spatial arrangements (characterisable, for example, by a distance L and/or at least one angle $\alpha, \beta$) of the terahertz device 10 and the object or reference object 20' relative to each other, including, for example, disposing 150a the terahertz device 10 and the object 20 and/or reference object 20' relative to each other in a given arrangement and determining 150b the reference data RD for said given arrangement, as well as, optionally, repeating 152 the steps of disposing 150a and determining 150b until, for example, a predeterminable termination criterion has been reached, wherein said disposing 150a includes, for example, positioning the terahertz device 10 and/or the object 20 or reference object 20' by means of a positioning device PE, PE' (FIG. 9) such as a robot.

In further exemplary embodiments, FIG. 14, provision is made for the method to further include: Determining 160, for example using (e. g. additional) sensors, at least one of the following elements: a) the distance L, AB between the terahertz device 10 and the object 20 or reference object 20', b) the angular orientation WA, for example in a one-dimensional arrangement (i. e., characterisable by an angle $\alpha$) or in a two-dimensional arrangement (i. e., characterisable by the angles $\alpha, \beta$), between the terahertz device 10 and the object 20 or reference object 20', c) the shape FO, for example the curvature, of a/the surface 20a of the object 20 or reference object 20'. In further exemplary embodiments, optical sensors (e. g. for laser distance measurement and/or laser angle measurement) and/or acoustic sensors (e. g. ultrasonic sensors) and/or sensors based on the utilisation of electromagnetic waves, such as radar sensors, may be used for said determining 160.

In further exemplary embodiments, FIG. 14, provision is made for the method to further include: Utilising 162 the distance L, AB and/or the angular orientation WA and/or the shape FO for the model MOD, for example for determining the term T and/or individual values of the term T.

In further exemplary embodiments, FIG. 15, provision is made for the method to further include: Determining 170 whether at least one region of interest, for example a reflection point GF (and/or all significant reflection points, that is, for example, all reflection points providing a pre-definable minimum contribution to a measurement and/or a measurement result), is located within a parameter range (characterisable, for example, by a distance range and/or an angle range) for which values T–1, T–2, T–3, . . . of the term T, and/or the reference data RD, characterisable, for example, via calculated and/or calibrated transmission functions, are available, and, on the basis of said determining 170, changing 172, where appropriate, a spatial arrangement, for example the distance and/or the angle(s), wherein, for example, said changing 172 is repeated 173 until e. g. the region of interest is located within said parameter range, and, optionally, performing 174 an evaluation. In further exemplary embodiments, said evaluation 174 may also be performed for the purposes of precalculating 140 (FIG. 12).

Further exemplary embodiments, FIG. 16, refer to a device 200 for performing the method according to these embodiments.

In further exemplary embodiments, provision is made for the device 200 to include: a computing device ("computer") 202, a storage device 204 associated with said computing device 202 for at least temporarily storing at least one of the following elements: a) data DAT (e. g. data of the model MOD and/or at least parts of the database DB (FIG. 1)). b) the computer programme PRG, in particular for executing a method according to the embodiments.

In further preferred embodiments, the storage device 204 has a volatile memory 204a (e. g. working memory (RAM)) and/or a non-volatile memory 204b e. g. flash EEPROM).

In further exemplary embodiments, the computing device 202 has, and/or is configured as, at least one of the following elements: a microprocessor (µP), a microcontroller (µC), an application-specific integrated circuit (ASIC), a system-on-chip (SoC), a programmable logic device (e. g. a field programmable gate array, FPGA), a hardware circuit, or any combinations thereof.

Further exemplary embodiments refer to a machine-readable storage medium SM comprising instructions PRG' which, when executed by a computer 202, cause the latter to execute the method according to the embodiments.

Further exemplary embodiments refer to a computer programme PRG comprising instructions which, when said programme is executed by a computer 202, cause the latter to execute the method according to the embodiments.

Further exemplary embodiments refer to a data carrier signal DCS which characterises and/or transmits said computer programme PRG according to the embodiments. The data carrier signal DCS may be received, for example, via an optional data interface 206 of the device 200.

In further exemplary embodiments, also the at least one positioning device PE, PE' may, for example, be controlled via said data interface 206.

Further exemplary embodiments, FIG. 17, refer to a utilisation 300 of the method according to the embodiments and/or of the device according to the embodiments and/or of the machine-readable storage medium according to the embodiments and/or of the computer programme according to the embodiments and/or of the data carrier signal according to the embodiments for at least one of the following elements: a) determining 302 at least one property of the object 20, for example a layer thickness D-M2 of at least one layer 20-2 of the object 20, b) enhancing 304 a precision of the model MOD, for example by taking into account a propagation of the terahertz radiation TS in the form of non-planar, for example not exclusively planar, waves, c) taking into account 306 a dependency of a spectral transmission function on a distance L to the terahertz device 10, and/or on an angular orientation between the terahertz device 10 and the object 20 and/or on a shape and/or surface property of the object 20, d) taking into account 306 a dependency of a spectral transmission function on an angle α, β with respect to the terahertz device 10, e) taking into account 308 a property of a/the surface 20a of the at least one object 20 or of a reference object 20', for example on the basis of a shape FO, for example a curvature, of the surface 20a, 20a' and/or a roughness of the surface 20a, 20a'.

FIG. 18 schematically shows a simplified block diagram according to further exemplary embodiments. What is shown is an arrangement, for example a measurement object, having two paint layers 20-1, 20-2 applied on a substrate 20-3 (e. g. metal), with an ambient medium UM, such as air, surrounding the arrangement. Exemplary embodiments and aspects will be described hereinafter with reference to the arrangement according to FIG. 18. By way of example, incoming and outgoing plane waves of the THz radiation are distinguished by the symbols "+"/"–".

In further exemplary embodiments, one or several of the following additional parameters (in relation with the equations described hereinabove) may be provided for the model MOD (FIG. 1):

$F_{A,n}^-$ ($\omega$) a frequency-dependent field strength of the backward-running THz pulse in air in the n-th iteration step $F_{1,n}^-$ ($\omega$) a frequency-dependent field strength of the backward-running THz pulse in the $1^{st}$ paint layer ("layer 1") 20-1 in the n-th iteration step $F_{2,n}^-$ ($\omega$) a frequency-dependent field strength of the backward-running THz pulse in the $2^{nd}$ paint layer ("layer 2") 20-2 in the n-th iteration step $F_{A,n}^+$ ($\omega$) a frequency-dependent field strength of the forward-running THz pulse in air UM in the n-th iteration step $F_{1,n}^+$ ($\omega$) a frequency-dependent field strength of the forward-running THz pulse in the $1^{st}$ paint layer 20-1 in the n-th iteration step $F_{2,n}^+$ ($\omega$) a frequency-dependent field strength of the forward-running THz pulse in the $2^{nd}$ paint layer 20-2 in the n-th iteration step $r_{12}$: a reflection coefficient at the boundary layer layer1/layer2

$r_{21}$: a reflection coefficient at the boundary layer layer2/layer1

$t_{12}$: a transmission coefficient at the boundary layer layer1/layer2

$t_{21}$: a transmission coefficient at the boundary layer layer2/layer1

$r_{2S}$: a reflection coefficient at the boundary layer layer2/substrate 20-3

D1: a layer thickness of layer 1 (layer 20-1)

D2: a layer thickness of layer 2 (layer 20-2)

$R_1$: a reflection index of layer 1

$R_2$: a reflection index of layer 2 n1, n2 are refraction indices for the layers 1 and 2.

e1, e2 are extinction coefficients for the layers 1 and 2.

In further exemplary embodiments, one or several of the following phase terms (e. g. as dependent parameters) may be provided for the model MOD (FIG. 1):

$$\bullet \ A(1) = \exp\left(-i\frac{i\omega}{c_0}2D_1(n_1 - i \in_1)\right)$$

phase term for two-times run through layer 1

$$\bullet \ B(1) = \exp\left(-i\frac{i\omega}{c_0}D_1(n_1 - i \in_1)\right) = \sqrt{A(1)}$$

phase term for one-time run through layer 1

$$\bullet \ A(2) = \exp\left(-i\frac{i\omega}{c_0}2D_2(n_2 - i \in_2)\right)$$

phase term for two-times run through layer 2

Since in further exemplary embodiments multiple reflections may be taken into consideration, an indefinite number of terms may be generated, the electric field $F_A^-$ generated by the arrangement according to FIG. 18 and reaching a THz detector 12, 12' (FIG. 6) is defined, in further exemplary embodiments, by a consecutive row, characterisable, for example, by:

$$F_S(\omega) = F_A^-(\omega) = \sum_{n=1}^{M} F_{A,n}^-(\omega)$$

In further exemplary embodiments, the electric fields in the layers 20-1, 20-2 (and, optionally, in the ambient medium UM) associated with the propagating THz radiation are each defined, for example, by a corresponding row, according to, or characterisable by, at least one of the following equations:

$$F_A^+(\omega) = \sum_{n=1}^{M} F_{A,n}^+(\omega)$$

$$F_1^-(\omega) = \sum_{n=1}^{M} F_{1,n}^-(\omega)$$

$$F_1^+(\omega) = \sum_{n=1}^{M} F_{1,n}^+(\omega)$$

$$F_2^-(\omega) = \sum_{n=1}^{M} F_{2,n}^-(\omega)$$

$$F_2^+(\omega) = \sum_{n=1}^{M} F_{2,n}^+(\omega)$$

In further exemplary embodiments, the starting conditions are selected as follows:

$F_{A,1}^+(\omega)=I_0(\omega, x, y, z)e^{-\Phi_0(\omega, \, x, \, y, \, z)}$: the incoming electrical field $F_{A,1}^-(\omega)=F_{1,1}^+(\omega)=F_{1,1}^-(\omega)=F_{2,1}^+(\omega)=F_{2,1}^-(\omega)=0.$ In further exemplary embodiments, the further terms are defined as follows:

$F_{A,n}^+(\omega)=0$ (only one incident THz pulse)

$F_{A,n}^-(\omega)=r_{1A}F_{1,n-1}^-(\omega)+r_{A1}F_{A,n-1}^+(\omega)$ $F_{1,n}^-(\omega)=r_{12}A(1)F_{1,n-1}^+(\omega)+B(1)t_{21}F_{2,n-1}^-(\omega)$ $F_{1,n}^+(\omega)=F_{1,n-1}^-(\omega)r_{1A}+t_{A1}F_{A,n-1}^+(\omega$ $F_{2,n}^-(\omega)=F_{2,n-1}^+(\omega)r_{2S}A(2)$ $F_{2,n}^+(\omega)=F_{1,n-1}^+(\omega)t_{12}B(1)+F_{2,n-1}^-r_{21}$ In further exemplary embodiments, the transfer function is determined as follows:

The reflected THz pulse $F_V^-$ takes into account the distance travelled in air and, in addition, is corrected by an offset $\Delta D$ between measurements at the layer packet 20-1, 20-2 and a reference measurement (see also FIG. 6)

$$F_V^-(\omega) = \left(\sum_{n=1}^{M} F_{V,n}^-(\omega)\right) e^{-\frac{i\omega}{c_0}2(L+\Delta D)(n_A - i \in A)}$$

In further exemplary embodiments, the reference measurement is as follows:

$$F(\omega) = r_{AM}I_0(\omega, x, y, z)e^{-i\Phi_0(\omega,x,y,z)}e^{-\frac{i\omega}{c_0}2(L)(n_A - i \in A)}$$

In order to take into account different distance ("z") dependencies, in further exemplary embodiments the term T described hereinabove and/or the term $G(D_1, R_1(n), D_2, R_2(n),\omega, x, y, z, \alpha, \beta)$, also referred to as weighting factor (or geometry factor) is inserted. For this purpose, in further exemplary embodiments, the outgoing ray is provided with a correction factor.

$F_{A,n}^+(\omega)=$(e. g. only one incident THz pulse)

$F_{A,n}^-(\omega)=(t_{1A}F_{1,n-1}^-(\omega)+r_{v1}F_{A,n-1}^+(\omega))\cdot G(D_1, R_1(n), D_2, R_2(n), \omega, x, y, z, \alpha, \beta)$ $F_{1,n}^-(\omega)=r_{12}A(1)F_{1,n-1}^+(\omega)+B(1)t_{21}F_{2,n-1}^-(\omega)$ $F_{A,n}^+(\omega)=F_{1,n-1}^-(\omega)r_{1A}+t_{A1}F_{A,n-1}^+(\omega)$ $F_{A,n}^+(\omega)=F_{2,n-1}^+(\omega)r_{2S}A(2)$ $F_{2,n}^+(\omega)=F_{1,n-1}^+(\omega)t_{12}B(1)+F_{2,n-1}^-(\omega)r_{21}$ where, for example, $R_1(n)$, $R_2(n)$ characterise a number of reflections of the THz radiation in layer 1 or in layer 2. These terms may be determined, in further exemplary embodiments, for example when calculating the rows, by means of the potency of A(1) and A(2) in the respective terms.

In further exemplary embodiments, it is possible to establish a generalisation of the model MOD so as to apply to "L-layer objects" (arrangements and/or measurement objects having a number of L layers), where $F_{m,n}$ stands for the electric field of the THz radiation of the m-th layer for the n-th iteration step, characterisable, for example, by:

$F_{m,n}^-(\omega)=r_{m,m+1}A(m)F_{m,n-1}^+(\omega)+B(m)t_{m+1,m}F_{m+1,n-1}(\omega)$ $F_{m,n}^+=F_{m,n-1}^-(\omega)r_{m,m-1}+t_{m-1,m}F_{m-1,n-1}^+(\omega)$ In further exemplary embodiments, the following special cases may be considered:

$F_{1,n}^-(\omega)=r_{12}A(1)F_{1,n-1}^+(\omega)+B(1)t_{21}F_{2,n-1}^-(\omega)$ $F_{1,n}^+(\omega)=F_{1,n-1}^-(\omega)r_{1A}+t_{1A}F_{A,n-1}^+(\omega)$ $m=L$(Last Layer)

$$r_{m,m+1} = r_{L,S}, R_{m+1,n-1}^{-}(\omega) = 0$$

$$F_{A,1}^{+}(\omega) = I_0(\omega, x, y, z) e^{-i\phi_0(\omega, x, y, z)}$$

5 the incoming electrical field, all the other terms are, for e. g. zero.

In further exemplary embodiments, the principle according to the embodiments may thus also be applied, for example, to L-layer objects and/or to the models MOD, MOD-1, MOD-2 for L-layer objects.

The invention claimed is:

1. A method of processing data which is associated with a model characterising a propagation of terahertz radiation in a space region for detecting at least one property of at least one object, said space region having at least one terahertz device for transmitting and/or receiving the terahertz radiation and/or the at least one object that may be exposed to said terahertz radiation, wherein said method comprises: providing the model, characterising, by using said model, a propagation of the terahertz radiation in the region of at least one boundary surface between two adjacent media within the space region, wherein said model has a term which characterises the THz radiation and which depends on at least one of the following elements: a) the frequency of the terahertz radiation, b) the spatial extension and/or the position of at least one of the two adjacent media wherein the model characterises a plurality of reflections and/or transmissions of the terahertz radiation on a plurality of boundary surfaces between two respective adjacent media within the space region by a coherent superposition function, wherein the term is provided as a weighting factor for at least some components of the coherent superposition function.

2. The method as claimed in claim 1, wherein the model characterises at least one reflection and/or transmission of the terahertz radiation on the at least one boundary surface between the at least two media, wherein the model characterises a plurality of reflections and/or transmissions of the terahertz radiation on at least two boundary surfaces between various different media, wherein the term characterising the terahertz radiation has a different value for each of the at least two boundary surfaces, wherein the term is provided as a weighting factor, other than one, for at least some components of the coherent superposition function.

3. The method as claimed in claim 1, wherein the model has a first component which characterises a sample measurement on the object in a reflection arrangement or a transmission arrangement by the terahertz radiation, wherein the first component may be characterised, in a frequency domain:

$$F_S(\omega, x, y, z) = I_0(\omega, x, y, z)$$

55

$$\exp\left[-i\frac{\omega}{c_0}[2(L + \Delta D)(n_A - i \in_A)] + i\Phi_0(\omega, x, y, z)\right] \cdot \left(t_{A1} t_{1A} \sum_{R=0}^{R_{max}} r_{1S}^{R+1}\right)$$

$$r_{1A}^R G(D, R, \omega, x, y, z, \alpha, \beta, \Omega) \exp\left[-i\frac{\omega}{c_0}(2R + 2)D(n - i \in)\right] + r_{A1}\right),$$

60 wherein $F_S$ characterises a field strength of a sample signal which may be frequency-dependent, wherein $\omega$ characterises angular frequency associated with a frequency of the terahertz radiation, wherein x characterises a first space coordinate, wherein y characterises a second space coordinate, wherein z characterises a third space coordinate, wherein $I_0$ characterises a field strength of the terahertz radiation at an emitter generating said terahertz radiation, which may be frequency-dependent, wherein exp characterises an exponential function, wherein i characterises the imaginary unit, wherein $c_0$ characterises the speed of light in vacuum, wherein L characterises a distance between the terahertz device and a reference object, wherein $\Delta D$ characterises an offset between the reference object and the object, wherein $n_A$ characterises an index of refraction of a medium present in the space region, wherein $\in_A$ characterises an extinction coefficient of the medium present in the space region, wherein $\phi_0$ characterises a phase of the terahertz radiation at the emitter generating said terahertz radiation which may be frequency-dependent, wherein ta, characterises a transmission coefficient at a boundary surface between the medium present in the space region and a layer characterising a surface of the object, wherein $t_{1A}$ characterises a transmission coefficient at the boundary surface between the layer characterising a surface of the object and the medium present in the space region, wherein $r_{1s}$ characterises a reflection coefficient at a boundary surface between a layer of the object and a substrate, wherein R characterises a reflection index which characterises a number and/or a serial order of reflections and/or transmissions of the terahertz radiation, wherein $r_{1A}$ characterises a reflection coefficient at a boundary surface between the layer characterising the surface of the object and the medium present in the space region, wherein G characterises the term characterising the THz radiation or a/the weighting factor, wherein D characterises a layer thickness of a layer, wherein n characterises a refraction index of a layer, wherein e characterises an extinction coefficient of a layer, wherein $r_{A1}$ characterises a reflection coefficient at a boundary surface between medium present in the space region and a layer characterising a surface of the object, wherein a and/or $\beta$ characterise(s) an angular orientation of the terahertz device relative to the object, wherein $\Omega$ characterises properties of a surface of the object, wherein said properties of the surface of the object include at least one of the following elements: a) a shape of the surface, b) a roughness of the surface, and wherein $R_{max} < \infty$.

4. The method according to claim 3, wherein for the reflection arrangement the first component is characterized on the basis of the following equation:

$$F_S(\omega, x, y, z) = I_0(\omega, x, y, z)$$

$$\exp\left[-i\frac{\omega}{c_0}[2(L + \Delta D)(n_A - i \in_A)] + i\Phi_0(\omega, x, y, z)\right] \cdot \left(t_{A1} t_{1A} \sum_{R=0}^{\infty} r_{1S}^{R+1}\right)$$

$$r_{1A}^R G(D, R, \omega, x, y, z, \alpha, \beta, \Omega) \exp\left[-i\frac{\omega}{c_0}(2R + 2)D(n - i \in)\right] + r_{A1}\right),$$

wherein $F_S$ characterises a field strength of a sample signal which may be frequency-dependent, wherein w characterises angular frequency associated with a frequency of the terahertz radiation, wherein x characterises a first space coordinate, wherein y characterises a second space coordinate, wherein z characterises a third space coordinate, wherein $I_0$ characterises a field strength of the terahertz radiation at an emitter generating said terahertz radiation, which may be frequency-dependent, wherein exp $[]$ characterises an exponential function, wherein i characterises the imaginary unit, wherein $c_0$ characterises the speed of light in vacuum, wherein L characterises a distance between the terahertz device and a reference object, wherein $\Delta D$ characterises an offset between the reference object and the object, wherein $n_A$ characterises an index of refraction of a medium present in the space region, wherein $\in_A$ characterises an extinction coefficient of the medium present in the space region, wherein $\Phi_0$ characterises a phase of the terahertz radiation at the emitter generating said terahertz radiation which may be frequency-dependent, wherein $t_{A1}$ characterises a transmission coefficient at a boundary surface between the medium present in the space region and a layer characterising a surface of the object, wherein $t_{1A}$ characterises a transmission coefficient at the boundary surface between the layer characterising a surface of the object and the medium present in the space region, wherein $r_{1S}$ characterises a reflection coefficient at a boundary surface between a layer of the object and a substrate, wherein R characterises a reflection index which characterises a number and/or a serial order of reflections and/or transmissions of the terahertz radiation, wherein $r_{1A}$ characterises a reflection coefficient at a boundary surface between the layer characterising the surface of the object and the medium present in the space region, wherein G characterises the term characterising the THz radiation or a/the weighting factor, wherein D characterises a layer thickness of a layer, wherein n characterises a refraction index of a layer, wherein e characterises an extinction coefficient of a layer, wherein $r_{A1}$ characterises a reflection coefficient at a boundary surface between medium present in the space region and a layer characterising a surface of the object, wherein a and/or $\beta$ characterise(s) an angular orientation of the terahertz device relative to the object, wherein $\Omega$ characterises properties of a surface of the object, wherein said properties of the surface of the object include at least one of the following elements: a) a shape of the surface, b) a roughness of the surface, wherein the first component may be characterised on the basis of the following equation:

$$F_S(\omega, x, y, z) = I_0(\omega, x, y, z)$$

$$\exp\left[-i\frac{\omega}{c_0}[2(L + \Lambda D)(n_A - i \in_A)] + i\Phi_0(\omega, x, y, z)\right] \cdot \left(t_{A1} t_{1A} \sum_{R=0}^{Rmax} r_{1S}^{R+1}\right.$$

$$\left. r_{1A}^R G(D, R, \omega, x, y, z, \alpha, \beta, \Omega)\exp\left[-i\frac{\omega}{c_0}(2R + 2)D(n - i \in)\right] + r_{A1}\right),$$

with $R_{max} < \infty$.

5. The method as claimed in claim 1, wherein the model has a second component which characterises a reference measurement at a reference object in a reflection arrangement or a transmission arrangement by the terahertz radiation, wherein the second component is characterised, in a frequency domain $$F_S(\omega, x, y, z) =$$

$$I_0(\omega, x, y, z)\exp\left[-i\frac{\omega}{c_0}[(2L)(n_A - i \in_A)] + i\Phi_0(\omega, x, y, z)\right] \cdot r_{AM},$$

wherein $F_s$ characterises a frequency-dependent, field strength of a reference signal, wherein x characterises a first space coordinate, wherein y characterises a second space coordinate, wherein z characterises a third space coordinate, wherein $I_0$ characterises a field strength of the terahertz radiation at an emitter generating said terahertz radiation, which may be frequency-dependent, wherein exp characterises an exponential function, wherein i characterises the imaginary unit, wherein $c_0$ characterises the speed of light in vacuum, wherein L characterises a distance between the terahertz device and a reference object, wherein $\Delta D$ characterises an offset between the reference object and the object, wherein $n_A$ characterises an index of refraction of a medium present in the space region, wherein $\in_A$ characterises an extinction coefficient of the medium present in the space region, wherein $\Phi_0$ characterises a phase of the terahertz radiation at the emitter generating said terahertz radiation which may be frequency-dependent, wherein $\omega$ characterises angular frequency associated with a frequency of the terahertz radiation, and wherein $r_{AM}$ characterises a reflection coefficient at a boundary surface between a medium present in the space region and a surface of the reference object.

6. The method as claimed in claim 5, wherein the model, for a reflection arrangement, is characterised in the frequency domain on the basis of the following equation:

$$H(\omega) =$$

$$\exp\left[-i\frac{\omega}{c_0}(2\Lambda D)(n_A - i \in_A)\right] \cdot \left(t_{A1} t_{1A} \sum_{R=0}^{Rmax} r_{1S}^{R+1} r_{1A}^R G(D, R, \omega, x, y, z,\right.$$

$$\left. \alpha, \beta, \Omega)\exp\left[-i\frac{\omega}{c_0}(2R + 2)D(n - i \in)\right] + r_{A1}\right)/r_{AM}.$$

wherein H $(\omega)$ characterises a transmission function of the terahertz radiation, related to a reference measurement, wherein w characterises angular frequency associated with a frequency of the terahertz radiation, wherein x characterises a first space coordinate, wherein y characterises a second space coordinate, wherein z characterises a third space coordinate, wherein $I_0$ characterises a field strength of the terahertz radiation at an emitter generating said terahertz radiation, which may be frequency-dependent, wherein exp characterises an exponential function, wherein i characterises the imaginary unit, wherein $c_0$ characterises the speed of light in vacuum, wherein L characterises a distance between the terahertz device and a reference object, wherein $\Delta D$ characterises an offset between the reference object and the object, wherein $n_A$ characterises an index of refraction of a medium present in the space region, wherein $\in_A$ characterises an extinction coefficient of the medium present in the space region, wherein $\Phi_0$ characterises a phase of the terahertz radiation at the emitter generating said terahertz radiation which may be frequency-dependent, wherein $t_{A1}$ characterises a transmission coefficient at a boundary surface between the medium present in the space region and a layer characterising a surface of the object, wherein $t_{1A}$ characterises a transmission coefficient at the boundary surface between the layer characterising a surface of the object and the medium present in the space region, wherein $r_{1S}$ characterises a reflection coefficient at a boundary surface between a layer of the object and a substrate, wherein R characterises a reflection index which characterises a number and/or a serial order of reflections and/or transmissions of the terahertz radiation, wherein $r_{1A}$ characterises a reflection coefficient at a boundary surface between the layer characterising the surface of the object and the medium present in the space region, wherein G characterises the term characterising the THz radiation or a/the weighting factor, wherein D characterises a layer thickness of a layer, wherein n characterises a refraction index of a layer, wherein e characterises an extinction coefficient of a layer, wherein $r_{A1}$ characterises a reflection coefficient at a boundary surface between medium present in the space region and a layer characterising a surface of the object, wherein $\alpha$ and/or $\beta$ characterise(s) an angular orientation of the terahertz device relative to the object, wherein $\Omega$ characterises properties of a surface of the object, wherein $r_{AM}$ characterises a reflection coefficient at a boundary surfaces between the medium present in the space region and a surface of the reference object, wherein the model is characterised in the frequency domain, on the basis of the following equation:

$$H(\omega) =$$

$$\exp\left[-i\frac{\omega}{c_0}(2\Lambda D)(n_A - i \in_A)\right] \cdot \left(t_{A1}t_{1A}\sum_{R=0}^{\infty} r_{1S}^{R+1} r_{1A}^R G(D, R, \omega, x, y, z,\right.$$

$$\left. \alpha, \beta, \Omega)\exp\left[-i\frac{\omega}{c_0}(2R + 2)D(n - i \in)\right] + r_{A1}\right)/r_{AM},$$

wherein the predetermined finite value $R_{max}$ of the reflection index is used.

7. The method according to claim 5, wherein for the reflection arrangement the second component is characterized on the basis of the following equation:

$$F_S(\omega, x, y, z) =$$

$$I_0(\omega, x, y, z)\exp\left[-i\frac{\omega}{c_0}[2(L)(n_A - i \in_A)] + i\Phi_0(\omega, x, y, z)\right] \cdot r_{AM},$$

wherein $F_s$ characterises a frequency-dependent, field strength of a reference signal, wherein x characterises a first space coordinate, wherein y characterises a second space coordinate, wherein z characterises a third space coordinate, wherein $I_0$ characterises a field strength of the terahertz radiation at an emitter generating said terahertz radiation, which may be frequency-dependent, wherein exp characterises an exponential function, wherein i characterises the imaginary unit, wherein $c_0$ characterises the speed of light in vacuum, wherein L characterises a distance between the terahertz device and a reference object, wherein $\Delta D$ characterises an offset between the reference object and the object, wherein $n_A$ characterises an index of refraction of a medium present in the space region, wherein $\in_A$ characterises an extinction coefficient of the medium present in the space region, wherein $\Phi_0$ characterises a phase of the terahertz radiation at the emitter generating said terahertz radiation which may be frequency-dependent, wherein w characterises angular frequency associated with a frequency of the terahertz radiation, and wherein $r_{AM}$ characterises a reflection coefficient at a boundary surface between a medium present in the space region and a surface of the reference object.

8. The method as claimed in claim 1, wherein the term is dependent, alternatively or in addition to a) the frequency of the terahertz radiation, and/or b) the spatial extension and/or position of at least one of the two adjacent media on at least one of the following elements: c) a reflection index characterising a number and succession of the reflections and/or transmissions, d) the angular orientation of the terahertz device with respect to the at least one object and/or a reference object, e) the distance between the at least one terahertz device and/or the at least one object, f) the property of a surface of the at least one object, comprising a shape of the surface and/or a roughness of the surface.

9. The method as claimed in claim 1,
wherein the model, by using the term and/or the weighting factor, models a distance-dependent spectral change of a transmission function of the terahertz radiation as a distance-dependent and/or depth-dependent attenuation and/or amplification and/or
wherein the model, by using the term and/or the weighting factor, models an angle-dependent spectral change of a transmission function of the terahertz radiation as an angle-dependent attenuation and/or amplification and/or
wherein the model, by using the term and/or the weighting factor, models a spectral change of a transmission function of the terahertz radiation on the basis of at least one property of a/the surface of the at least one object, as based on a shape of the surface and/or a roughness of the surface.

10. The method as claimed in claim 1, wherein the model includes an object having several layers of different media, wherein the model characterises at least one of the following elements: a) reflections and/or transmissions of the terahertz radiation in the object, between adjacent layers, b) multiple reflections and/or multiple transmissions of the terahertz radiation in the object, c) virtual reflection points and/or virtual transmission points in the object, which may be characterised by a reflection index, d) a coherent superposition of the different reflections and/or transmissions of the terahertz radiation in the object.

11. The method as claimed in claim 1, further comprising: determining the term and/or individual values of the term on the basis of an optical model of a system characterising the terahertz device and the object and/or reference object as well as an ambient medium surrounding the terahertz device and the object or reference object.

12. The method as claimed in claim 11, wherein the optical model takes into account diffraction effects of the terahertz radiation.

13. The method as claimed in claim 11, further including: determining the optical model on the basis of a modelisation by means of a) ray tracing and/or b) a description based on the Theory of Diffraction, by a diffraction integral, and/or c) a parametric calculation having model function, and calibrating said optical model, wherein determining, and/or calibrating the optical model is/are carried out by a frequency-resolved technique.

14. The method as claimed in claim 13, further including: calibrating the optical model with respect to a spectral transmission function and/or a spatial amplitude and/or phase, on the basis of at least one of the following elements: a) an angle between an optical axis of the terahertz device and a surface normal of the object or reference object, b) a distance between the terahertz device and a surface of the object or reference object, c) a property of a/the surface of the at least one object and/or a reference object of the surface and/or a roughness of the surface, d) a frequency of the terahertz radiation.

15. The method as claimed in claim 13, further including: varying the spatial position of reflection points and/or transmission points characterised by the model, deriving a property comprising the thickness of at least one layer of a medium of the object on the basis of said varying, wherein at least one of the following elements is used for said deriving: a) performing a correlation method, b) performing a method for pattern recognition, c) determining peaks and/or dips, d) utilising a machine learning method, e) performing a fitting method.

16. The method as claimed in claim 13, further including: determining reference data for several different spatial arrangements of the terahertz device and the object or reference object relative to each other, including disposing the terahertz device and the object and/or reference object relative to each other in a given arrangement and determining the reference data for said given arrangement, as well as repeating the steps of disposing and determining until a predeterminable termination criterion has been reached, wherein said disposing includes positioning the terahertz device and/or the object or reference object by a positioning device.

17. The method as claimed in claim 13, further including: determining, using sensors, at least one of the following elements: a) the distance between the terahertz device and the object or reference object, b) the angular orientation, in a one-dimensional or two-dimensional arrangement, between the terahertz device and the object or reference object, c) the shape of a/the surface of the object or reference object.

18. The method as claimed in claim 17, further including: utilising the distance and/or the angular orientation and/or a property of a/the surface of the at least one object or of a reference object, on the basis of a shape of the surface and/or a roughness of the surface, for the model to determine the term and/or individual values of the term.

19. The method as claimed in claim 16, further including: determining whether at least one region of interest is located within a parameter range for which values of the term, and/or the reference data, which is characterised by calculated and/or calibrated transmission functions that are available, and, on the basis of said determining, changing a spatial arrangement, a distance and/or an angle, wherein said changing is repeated until the region of interest is located within said parameter range, and performing an evaluation.

20. The method as claimed in claim 11, further including: determining by precalculating at least one component of the model and/or the optical model as well as at least temporarily storing results of said determining by precalculating, wherein said results are stored in a database.

21. The method as claimed in claim 11 wherein the optical model characterises a spectral transmission function of the terahertz radiation within the system and/or wherein the optical model characterises an amplitude and phase across the spatial extension of the terahertz radiation within the system.

22. A device for performing the method as claimed in claim 1.

23. A utilisation of the method as claimed in claim 1 and/or of a device for performing the method as claimed in claim 1 for at least one of the following method steps: a) determining at least one property of the object, b) enhancing a precision of the model by taking into account a propagation of the terahertz radiation in the form of non-planar waves, c) enhancing a precision of the model by taking into account a dependency of a spectral transmission function on a distance to the terahertz device, d) enhancing a precision of the model by taking into account a dependency of a spectral transmission function on an angle with respect to the terahertz device, e) enhancing a precision of the model by taking into account a property of a/the surface of the at least one object or of a reference object, on the basis of a shape of the surface and/or a roughness of the surface.

* * * * *